May 29, 1956 R. H. SIFFERD ET AL 2,748,152
RENDERING PROCESS FOR RECOVERY OF FAT AND GELATIN
Filed Oct. 2, 1952
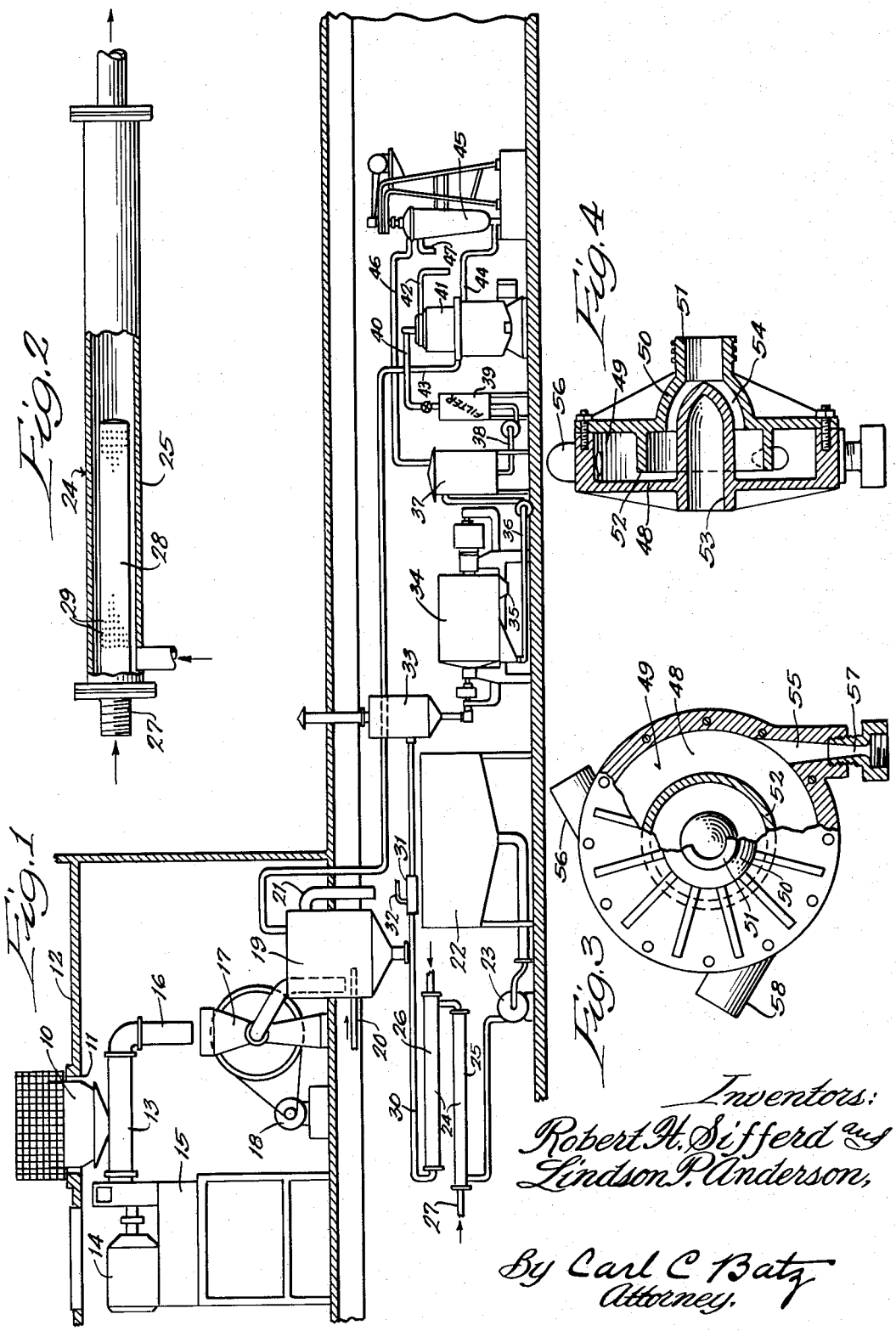
Inventors:
Robert H. Sifferd and
Lindson P. Anderson,
By Carl C. Batz
Attorney.

United States Patent Office 2,748,152
Patented May 29, 1956

2,748,152

RENDERING PROCESS FOR RECOVERY OF FAT AND GELATIN

Robert H. Sifferd, Joliet, and Lindson P. Anderson, Chicago, Ill., assignors to Armour and Company, Chicago, Ill., a corporation of Illinois Application October 2, 1952, Serial No. 312,682

2 Claims. (Cl. 260—412.6)

This invention relates to a rendering process for the recovery of fat and gelatin. It is particularly useful as a continuous process for the rendering of lard and pork fat and for the separate recovery of an edible gelatin.

In the rendering of fat-bearing material, such as lard and pork fat, it is necessary under present practice to employ large vessels, taking up substantial space in buildings. Large pressure vessels are employed which are a source of hazard, and steam is consumed in large amount by reason of the prolonged rendering time. Large tankage presses have to be employed. Further, the treatment under present practice by reason of such prolonged rendering time has an adverse effect upon the rendered fat product in respect to flavor, stability, color, and free fatty acid. Further, the process results in carrying the collagen beyond the gelatin stage and in the loss of gelatin as a product.

An object of the present invention is to provide a process for the rendering of fat, by which the space required is reduced to less than one-tenth that previously required, while the equipment requirement is reduced in similar proportions. The hazards inherent in large pressure vessels are removed, and steam consumption markedly reduced. Tankage presses are also eliminated. A further object is to provide a fat rendering process in which the yield of rendered fat is increased substantially, while also improving the quality of the rendered fat in regard to flavor, stability, color, and free fatty acids. Yet another object is to provide a fat rendering process in which edible gelatin is recovered from the stick water of the process. Yet another object is to provide a continuous fat rendering method in which fat-bearing material is flash heated in the presence of steam to produce an immediate raising of temperature of the material to the desired temperature and continuously recovering from the flash heated material the lard or other fat and the solid material separated therefrom. Other specific objects and advantages will appear as the specification proceeds.

The process may be carried out in any suitable apparatus, as, for example, apparatus shown in the accompanying drawing, in which—

Figure 1 is a side view in elevation of such apparatus; Fig. 2, an enlarged part sectional view of a heater tube employed; Fig. 3, a broken side view in elevation of a modified form of flash heater; and Fig. 4, a transverse sectional view of the structure shown in Fig. 3.

In the illustration given in Figs. 1 and 2, hashed fat is passed through the hopper 10 supported in a hole 11 in the floor 12 of a building and the pieces of fat pass through the hopper into a grinder 13, the grinder being driven by a motor 14 supported upon the platform 15. Grinder 13 may be employed to chop the pieces of fat into rather coarsely ground material, and the material is then passed through the conduit 16 into the second grinder 17 driven by motor 18. The finely-ground material, which, for example, may be reduced to ¼ inch pieces or less, is passed into the preheating tank 19, and steam is passed through pipe 20 into the material to render it fluid. The fluid material overflows through pipe 21 into the holding tank 22. Pump 23 takes the material from the holding tank 22 and passes it through the cooker 24.

The cooker 24 may be formed of one tube or any number of tubes. In the illustration given, the material passes first into the tube 25 of the cooker 24 and then into the tube 26, as shown more clearly in Fig. 1. Each of the tubes 25 or 26 is provided with a steam inlet 27 communicating with a perforated pipe 28 which extends partly through the tube, as illustrated best in Fig. 2. A porous pipe provides an excellent heater since the steam then passes through a great multitude of openings and forms a perfect sheath around the pipe. In the specific illustration given in Fig. 2, the pipe is a metal pipe closed at its inner end and provided with a large number of small openings 29 through which steam escapes into the interior of tube 25.

From the heater 24, the material passes through the pipe 30 and a control valve 31. Any suitable valve for controlling the pressure upon the heater 24 may be employed. Such a valve structure comprises a flexible tube within the casing of the valve, and a valve-controlled pressure fluid pipe 32 conveys fluid to the valve for the closing of the flexible tube when it is desired to close conduit 30. Release of the pressure fluid in pipe 32 permits the pipe 30 to be opened and the material may then pass on to the vent tank 33.

From the vent tank 33, the material passes down into the centrifuge 34 which may be of any suitable type or structure. We prefer to employ a centrifuge of the type illustrated in detail in our co-pending application Serial No. 681,690 for Preparation of Liver Products. The continuous centrifuge 34 separates the material into two fractions, (a) large particles of water-insoluble solids, and (b) a mixture of fat and water suspension of fines. The solid fraction is discharged from the centrifuge through outlet 35 and is recovered as dried tankage.

The liquid suspension is pumped through the pipe 36 into the separation tank 37 and from thence is pumped through line 38 into the filter 39. The filter may be merely a screen of about 50 mesh for keeping undesirably large materials out of the succeeding centrifuges. From the filter 39, the material passes through pipe 40 into a centrifuge 41, which is of well-known construction. Centrifuge 41 is a centrifuge which divides the material into three streams. Through pipe 42 is discharged a pure dry oil, constituting the desired fat product. Through pipe 43 is discharged sludge which is returned to the preheating tank 19 so that it may again pass through the process. Water is discharged through the pipe 44 and the centrifuge is so set that with the water a small amount of the oil passes to the centrifuge 45.

The centrifuge 45 is set so as to separate all of the fat along with a small amount of water in one stream, and this stream is fed back through pipe 46 to the separation tank 37 from which it undergoes repeated separation.

Water containing gelatin is discharged through pipe 47, and the gelatin is recovered by evaporation or other treatment of the water. Such gelatin, by reason of the heating method described, is not carried beyond the gelatin stage and, upon recovery, is found to be an excellent edible gelatin. The stick water recovered through pipe 47 is found to be clean and very low in color. Upon purification, it is found to be an excellent source of edible gelatin.

Instead of employing the heater 24, good results are obtained by using the flash heating apparatus illustrated in Figs. 3 and 4. The water comprises a casing member 48 providing an inner heating chamber 49 and a casing closure 50. The casing 50 provides an outlet 51 and is provided with reinforcing ribs 52. The casing 48 is provided with an inwardly-extending hollow portion 53 providing a restricted annular outlet 54 communicating with the outlet pipe 51. Steam is introduced into the chamber 49 through the two inlets 55 and 56, each of the inlets being preferably provided with steam injection nozzles 57. The material from the pump 23 is preferably introduced through the inlet 58 into chamber 49. All three inlets are tangential to chamber 49 and form an annular mixed stream in which the steam intimately contacts the material and heats it in an extremely brief time to the temperature desired. The heated material passes inwardly and is discharged together with the condensed steam through outlet 51, being then passed through line 30 and the valve 31, as heretofore described. By flash heating of the fat-bearing collagenous material we find that the collagen is hydrolyzed gelatin without any substantial portion of the collagen being hydrolyzed beyond the gelatin stage and then, when the resulting materials are centrifuged, a liquid fraction is obtained from which the fat readily separates. By maintaining the flash heating treatment at a period less than a minute and preferably at a much lower time, we find that the stability of the finished fat increases greatly while the moisture content is also greatly reduced. Further, the gelatin is recovered as a valuable by-product after the removal of the fat.

OPERATION

In the operation of the process, hashed fat, such as, for example, animal fat is passed through the hopper 10 into the first grinder 13 and from thence into the fine grinder 17. By way of example, the fat in the first grinder 13 may be reduced to pieces of the order of 1 inch or 1½ inches across, and such coarsely-ground material in the second grinder 17 may be reduced in size to ¼ inch or less. The ground material in preheating tank 19 is rendered fluid by contact with the steam from pipe 20. The fluid material overflows through pipe 21 into holding tank 22, from which it is pumped through the heater 24.

We have found that by employing a heater of small cross section and by passing the material through the same in contact with steam for an extremely brief period, that unusual and surprisingly good results are obtained. We prefer to pass the material through the entire heater in about a minute, and preferably at a much greater speed. For example, excellent results are obtained when the time interval for the flash rendering is eight seconds or less. The temperature will vary depending upon the type of fat to be melted, and the employment of pressure will also depend upon the material being treated. The temperatures and pressures at which the various fats are rendered, are very well-known in the meat packing industry. For example, in the rendering of pork fat, we prefer to employ a temperature in the range of 212–320° F., the higher temperature range being maintained during the flash cook by suitable pressure control. We have employed pressures of from 70 pounds down to atmospheric.

The flash cooker 24 is the only pressure apparatus employed in the entire operation, and it may be made of standard pipe which need not be larger than three-inch in diameter and a few feet long.

The heated fat mixture passes through the valve 31 upon the release of pressure fluid in pipe 32 and enters the small vent tank 33, the pressure at this point being restored to atmospheric. From the vent tank 33, the material goes into the centrifuge 34 where it is separated into a fraction containing larger particles of water-insoluble solids and into a fraction containing a mixture of fat and water suspension of fines. The solid fraction is discharged through pipe 35 and may be conveyed to a drier for recovery as dried tankage. The liquid suspension is pumped to the separation tank 37, from which it is pumped through the filter 39 and thence into the separator 41. In separator 41, the liquid suspension is separated into three fractions, (a) rendered fat, (b) stick water, and (c) fine solids. All three components are discharged continuously, the rendered fat through pipe 42, the fine solids through pipe 43, and the stick water containing a small amount of oil through pipe 44 to the secondary separator 45. The material discharged through pipe 43 may be returned to the tank 19, or, alternatively, to a tankage drier, or to the feed for the centrifuge 34.

The secondary separator 45 recovers traces of fat from the stick water and returns this to the separation tank 37. The stick water containing the edible gelatin is passed from pipe 47 to a purifier or evaporator for the recovery of edible gelatin.

In the flash heating described, water is supplied as the water of the tissue, and to this is added condensed water from the steam, such added water amounting to from about 10% to 12% of the total weight of the material. The condensed water and steam improve the color of the product, aiding in the agitation and washing of the product during the flash heating step. Extremely good heat transfer is brought about without scorching the protein by reason of the agitation and turbulence brought about through the use of the steam and water. In the heater 24, the mass of steam leaving the perforations in pipe 29 forms a sheath around the pipe and prevents protein from reaching the pipe and coagulating thereon. Further, in the heater shown in Figs. 3 and 4, the rotating annulus of steam and water eliminates to a substantial extent any tendency of the protein materials to stick to the walls of the baffle surfaces.

The yield of the rendered fat is greatly increased due to the lower fat content of tankage and the lower fat content of stick water, while the rendered fat is greatly improved in quality as to flavor, stability, color and free fatty acids. These results are largely due to the flash heating with steam carried on in a very brief time. We prefer that the heating be not over one minute and preferably under 30 seconds. Unusually good results have been obtained where the heating interval is 8 seconds and less. Good results have been obtained where the heating is less than a second.

By the brief heating treatment described, the collagen is not hydrolyzed beyond the gelatin stage, and a by-product of edible gelatin is obtained continuously in the operation of the process.

A satisfactory heater such as illustrated by the heater 24 may be employed which holds less than a gallon of the material while heating as much as 1,200 pounds in an hour. By reducing the interval of heating, the heater may be caused to handle considerably more of the material.

The operation is rapid, bringing about a melting of the fat material and a quick separation thereof from the solid or unmelted material, while at the same time providing for the recovery of gelatin as a separate product.

The improved process is especially advantageous for producing lard by the rendering of the fat of hogs, but is also applicable to the rendering of tallow from beef fat and for rendering of oils and fats from any fat bearing tissue.

Following are specific examples of operation in accordance with our process:

Example 1

12,000 pounds of pork fat is ground to a particle size of one-eighth inch. The ground fat is preheated to about 110° F. to give it a consistency that will flow well. This semi-fluid mass is delivered at a constant rate of about 200 pounds per minute to the steam flash cooker in which it is rendered at about 212° F. and atmospheric pressure. The rendered mass is delivered continuously to a Bird type continuous operating centrifuge. In the foregoing operation, in which the semi-fluid mass was delivered at a constant rate of about 200 pounds per minute to the steam flash cooker in which it was rendered at about 212° F. at atmospheric, we find that the period of time in which this material remains within the cooker 24, which holds less than a gallon, was about .29 second. At this centrifuge the material is separated into two phases, (1) a water-oil emulsion, and (2) insoluble protein particles. The insoluble particles may be used for tankage. The water-oil emulsion is delivered continuously to a second centrifuge which is of the Sharples self-cleaning type. In this machine a three-way separation is accomplished and there is obtained (1) clean dry oil, (2) water-containing oil, and (3) fine meat particles suspended in water. The clean dry oil is sent to the finishing operation for lard production; the water-containing oil is delivered to a third centrifuge of the Sharples type ; and the water suspension of meat particles is recycled along with further quantities of hashed fat. The water-containing oil is separated in the third centrifuge into (1) clean water for the production of "liquid stick" animal food, and (2) oil containing a small amount of water which is returned to the second centrifuge for reseparation. A yield of 10,900 pounds of lard is obtained.

*Example 2*

The procedure of Example 1 is repeated using pork trim fat instead of pork leaf fat. Although pork trim fat is considered inferior to pork leaf fat for the production of lard, the lard produced by our process from pork trim fat is substantially the same quality as lard from pork leaf fat. This comparison is based on tests made in accordance with standard control analysis methods. In this procedure, using pork trim fat, there is obtained a yield of 8,800 pounds of lard from 12,000 pounds of fat material.

*Example 3*

PRODUCTION OF OLEOMARGARINE 12,000 pounds of beef caul fat is reduced by standard grinders to a particle size of one-eighth inch. The hashed fat is preheated to a consistency that will flow. The semi-fluid mass is delivered at a constant rate to a steam injection cooker which renders the mass at 212° F. and atmospheric pressure. The rendered mass is delivered continuously to a centrifuge. Separation into two phases, (1) water-oil emulsion, and (2) insoluble particles, is accomplished at this point. The insoluble particles of protein are used for tankage. The water-oil emulsion is delivered continuously to a second centrifuge which accomplishes a three-way separation; (1) clean dry oil sent to usual finishing operation for oleo production, (2) water-containing oil delivered to a third centrifuge, (3) fine meat particles suspending in water recycled with the hashed fat. The water-containing oil is separated into (1) clean water for production of "liquid stick," and (2) oil containing a small amount of water which is returned to the second centrifuge for reseparation. A yield of 9,900 pounds of oleo oil is obtained from 12,000 pounds of beef caul fat.

*Example 4*

12,000 pounds of pork leaf fat is reduced by standard grinders to a particle size of one-quarter inch. The hashed fat is preheated to a consistency that will flow. The semi-fluid mass is delivered at a constant rate to a steam injection cooker which renders the mass at 320° F. and 75 pounds steam pressure. From this point the procedure is conducted in accordance with the corresponding steps in Example 1.

*Example 5*

The process described in Example 4 is repeated using the same temperatures and processes but employing pork trim fat instead of pork leaf fat. A lard product is obtained which has substantially the same high quality as obtained according to Example 2.

*Example 6*

12,000 pounds of beef caul fat is reduced by standard grinders to a particle size of one-quarter inch. The hashed fat is preheated to a consistency that will flow. The semi-fluid mass is delivered at a constant rate to a steam injection cooker which renders the mass at 274° F. and 30 pounds steam pressure. The remainder of the process is conducted according to the corresponding steps as set forth in Example 3, and the oleo oil obtained is substantially the same high quality as in Example 3.

*Example 7*

The process was carried out as described in Example 1 except that the fat was rendered at a temperature of about 310° F. at slightly less than 8 seconds. The process was also carried on at a temperature of 310° F. for 12 seconds. The process was carried on at 320° F. at a time interval of about .7 seconds.

*Example 8*

A mixture of 845 lbs. of pork fat consisting of pieces taken from the belly, ham and neck, were hashed in an Allbright-Nell hasher using ½ inch plates. The hashed fat was thoroughly mixed and preheated to 85-95° F. to put it into a flowable condition. This semi-fluid mass was then delivered to a steam "flash" cooker.

The cooker consisted of standard pipe 4" in diameter and 5 feet in length into which there is inserted a perforated pipe of smaller diameter through which steam is admitted to the system.

Rendering was begun on a continuous basis at 300–310° F. and a sample of the rendered slurry was taken as it discharged from the cooker. It was strained through a 20 mesh screen and centrifuged to remove fines. The calculated time for which any given unit of fat slurry was in the cooker amounted to a total of 0.82 second. This calculation is based upon a constant rate of feed of about 72.5 lbs. per minute.

*Example 9*

In order to provide evidence of the difference which exists between flash rendering at 300–310° F. for less than one minute and above two minutes in our process, the following modifications were made in the above procedure and apparatus.

Valves were inserted at the inlet and outlet of the cooker, pipe 25, at the points indicated by the arrows (see Figure 2). A charge of 28 lbs. of fat slurry was admitted to the cooker. The fat feed valve to the cooker and the rendered slurry discharge valve were shut off simultaneously and the steam pressure adjusted to maintain a temperature of 300° F. At the end of the time period, the contents of the cooker were collected, strained through a 20 mesh screen and centrifuged to remove fines. In this test the cooker was filled with a new charge of fat and each new charge held there at intervals of 2, 3 and 6 minutes. The results of the tests are set out in the following table:

TABLE I

|  | Color (Lovibond) | | Stability | Moisture |
| --- | --- | --- | --- | --- |
|  | Y | R | | |
| Flash rendering | 5 | .9 | 7 | .03 |
| 2 min | 4 | .7 | 5 | .17 |
| 3 min | 6 | .9 | 3 | .16 |
| 6 min | 6 | 1.0 | 2½ | .21 |

From the information shown in Table I, it is apparent that significant alterations are made in the rendered fat when a 2 minute treatment sample is compared with a flash rendered sample treated for 0.82 second.

By heating the material in the pipe cooker for a period of not over one minute, and preferably under 30 seconds, new results are obtained which are of considerable value. In the first place, the yield of first run quality rendered fat is greatly increased. In the second place, the rendered fat is greatly improved in quality as to flavor, stability, color, and moisture content. In the third place, the brief heating period does not hydrolyze the collagen beyond the gelatin stage and for the first time we are able to obtain a by-product of edible gelatin which moreover we are able to obtain continuously.

By heating for less than one minute, and preferably for a period of about 8 seconds or less, and through the use of live steam in the elongated tube, we find that the fat material melts rapidly and quickly separates from a solid or unmelted material and the turbulence produced by the steam in the small vessel apparently prevents scorching of the protein. Further, the brevity of the heating period eliminates the development of off-flavors and the resulting fat is of high quality with respect to stability, color, and moisture content. The collagen is not carried beyond the gelatin stage and is recovered as excellent edible gelatin.

While in the foregoing specification, we have set forth certain steps in detail and have described the apparatus employed in considerable detail, it will be understood that such details are set out for the purpose of illustrating one mode of operation of the invention and that such details may be varied widely by those skilled in the art without departing from the spirit of our invention.

We claim:

1. A process for rendering animal fat wherein gelatin is obtained as a by-product, comprising the steps of comminuting animal material composed principally of fat and containing a lesser amount of collagen, passing the comminuted material in the form of an aqueous slurry continuously through an elongated restricted zone and while maintaining said material in turbulent agitation by means of a plurality of steam jets within said restricted zone, heating said material within said zone to a temperature sufficient to liquefy substantially all of the fat therein without hydrolizing the collagen therein beyond the gelatin stage, thereby liberating the fat in said material and at the same time converting the collagen to gelatin, recovering the liquified fat from said slurry, and then recovering gelatin as a by-product from the remaining liquid portion of said slurry.

2. The process of claim 1 in which said comminuted material is passed through said restricted zone in less than one minute, and in which said material is heated within said zone to a temperature ranging from 212° to 320° F.

References Cited in the file of this patent
UNITED STATES PATENTS

| | | |
|---|---|---|
| 1,742,666 | Owe | Jan. 7, 1930 |
| 1,760,059 | Hiller | May 27, 1930 |
| 1,845,893 | Sommermeyer | Feb. 16, 1932 |
| 2,516,071 | Pavia | July 18, 1950 |
| 2,580,049 | Sifferd et al. | Dec. 25, 1951 |